(12) United States Patent
Rosander et al.

(10) Patent No.: US 11,386,741 B2
(45) Date of Patent: Jul. 12, 2022

(54) CALIBRATING OBJECT SENSOR DEVICES IN A GAMING SYSTEM

(71) Applicant: IGT, Las Vegas, NV (US)

(72) Inventors: Tai Rosander, Reno, NV (US); Thomas D. Waxman, Reno, NV (US); Andreas Bean, Graz (AT); Robert N. Silva, Reno, NV (US)

(73) Assignee: IGT, Las Vegas, NV (US)

( * ) Notice: Subject to any disclaimer, the term of this patent is extended or adjusted under 35 U.S.C. 154(b) by 112 days.

(21) Appl. No.: 17/033,073

(22) Filed: Sep. 25, 2020

(65) Prior Publication Data

US 2021/0082234 A1 Mar. 18, 2021

Related U.S. Application Data

(63) Continuation of application No. 15/854,942, filed on Dec. 27, 2017, now abandoned.

(51) Int. Cl.
  *G07F 17/32* (2006.01)
  *G06T 7/80* (2017.01)
  *G06T 7/73* (2017.01)
  *G07F 17/34* (2006.01)

(52) U.S. Cl.
  CPC ...... *G07F 17/3209* (2013.01); *G07F 17/3206* (2013.01); *G07F 17/3211* (2013.01); *G07F 17/3227* (2013.01); *G06T 7/74* (2017.01); *G06T 7/80* (2017.01); *G06T 2207/30204* (2013.01); *G07F 17/329* (2013.01); *G07F 17/3293* (2013.01); *G07F 17/34* (2013.01)

(58) Field of Classification Search
  None
  See application file for complete search history.

(56) References Cited

U.S. PATENT DOCUMENTS

| | | | |
|---|---|---|---|
| 2017/0249745 A1* | 8/2017 | Fiala | G06T 7/277 |
| 2018/0249151 A1* | 8/2018 | Freeman | A61F 9/00 |
| 2019/0197818 A1 | 6/2019 | Rosander et al. | |

OTHER PUBLICATIONS

Official Action for U.S. Appl. No. 15/854,942, dated Jan. 13, 2020 21 pages.
Official Action for U.S. Appl. No. 15/854,942, dated Jun. 26, 2020 26 pages.

* cited by examiner

*Primary Examiner* — Idowu O Osifade
(74) *Attorney, Agent, or Firm* — Sheridan Ross P.C.

(57) ABSTRACT

Various embodiments are provided for calibration of motion player tracking devices in electronic gaming machines (EGMs). A plurality of object sensors positioned adjacently to a display device of the EGM each record a plurality of data frames inclusive of a position of a plurality of fiducial markers relative to the plurality of object sensors. At predetermined intervals, the plurality of object sensors are calibrated in three-dimensional space using the position of the plurality of fiducial markers relative to the plurality of object sensors within the recorded plurality of data frames.

20 Claims, 8 Drawing Sheets

CALIBRATING OBJECT SENSOR DEVICES IN A GAMING SYSTEM

BACKGROUND

The present disclosure relates in general to gaming devices and systems and more particularly, to calibrating a motion player tracking device in a gaming system.

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of electronic games. Many electronic gaming machines (EGMs), such as slot machines and video poker machines, have been a cornerstone of the gaming industry for several years. The EGMs include specially programmed computers and contain multiple external interfaces.

BRIEF SUMMARY

Various embodiments are disclosed for improving gaming technology by EGMs and methods of operating EGMs that provide enhanced physical player interaction. In some embodiments, the EGM may include (a) a display device, (b) at least one camera (which may be termed herein as an "object sensor") configured to track or determine one or more positions of at least one of the player's hands in a player interaction zone in front of the display device, and (c) a plurality of fiducial markers used for calibrating the plurality of object sensors. The plurality of fiducial markers may be located to a right and a left side of the display device and positioned such that they are observed by the plurality of object sensors. In various embodiments disclosed herein, the EGM further includes at least one memory device storing a plurality of computer instructions that, when executed by the at least one processor, cause the at least one processor to operate with the display device and the plurality of object sensors to record, by the plurality of object sensors, a plurality of data frames inclusive of a relative position of the plurality of fiducial markers adjacently located to the display device; and calibrate the plurality of object sensors in three-dimensional space using the relative position of the plurality of fiducial markers within the recorded plurality of data frames.

Because the fiducial markers are affixed to the EGM permanently in a location that is visible by the camera(s), this allows the calibration to be performed on a schedule without intervention by an operator. Further, because the set-up is tightly controlled, the x, y, z coordinate locations of the fiducial markers and camera(s) are well contained to tight tolerances by the manufacturing and assembly process. The calibration only applies to the rotation of the camera(s) (which is the larger contributor to error), which necessitates only two simple fiducial markers for each camera, rather than more complicated arrangements found in some existing systems.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying drawings.

DETAILED DESCRIPTION

Various aspects of the presently disclosed technology provide graphical processing and computing enhancements of EGMs, and methods of operating such enhanced EGMs. For brevity and clarity, and unless specifically stated otherwise, the term "EGM" is used herein to refer to any electronic gaming machine known in the art (such as but not limited to a slot machine, a video poker machine, a video card machine, a video lottery terminal (VLT), a video keno machine, a video bingo machine, etc.).

Enhanced Interactive EGM—System Description

Figure 5:
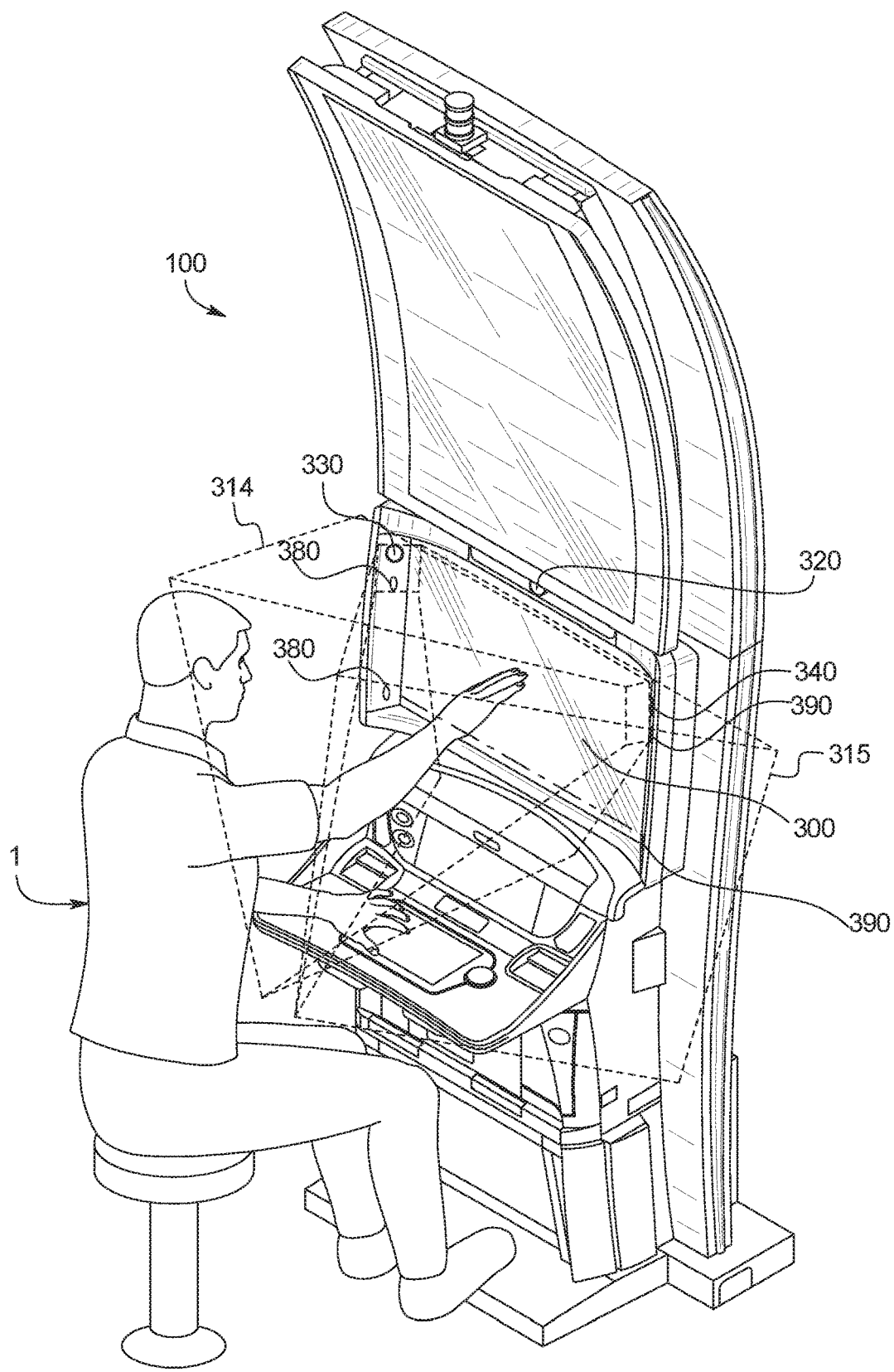
FIG. 5 is a front perspective view of the EGM of FIG. 1, showing in phantom left and right player hand location zones provided by the EGM.

Referring now to FIGS. 1, 2, 3, 4, and 5, one example EGM of the present disclosure is generally illustrated and indicated by numeral 100. This example EGM 100 illustrated in FIGS. 1, 2, 3, 4, and 5 generally includes a support structure or cabinet 200 that supports a plurality of output devices and a plurality of input devices of the EGM 100 among other components. In this illustrated example embodiment, the plurality of output devices includes: (a) a first or intermediate display device 300; (b) a second or upper display device 400 positioned above the first or intermediate display device 300; and (c) a third or lower display device 500 positioned below the first or intermediate display device 300. These output devices are configured to display the games, game outcomes, awards (such as the primary and secondary games awards or other game outcome awards), and other functionality and information to a player 1 (see FIG. 5). In this illustrated example embodiment, the plurality of player input devices enable the player 1 to play one or more wagering games provided by the EGM. Such player input devices can also include one or more of the input devices described below in the second section of this detailed description. These player input devices are physically touchable or activatable by the player 1 to enable the player 1 to make inputs into the EGM. These output devices and input devices are configured such that a player 1 may operate the EGM while standing or sitting, but preferably operates the EGM while the player 1 is sitting in front of the EGM 100 such that the player's head is approximately at the same height as the first display device 300 (as generally shown in FIG. 5).

In various embodiments of the present disclosure, the EGM of the present disclosure may include one or more of the following: (a) the first display device configured to display three-dimensional ("3D") images to the player without requiring the player 1 to wear 3D glasses; (b) a player eye or head tracker configured to track the movement of the eyes and/or head of the player 1; (c) a player hand position locator configured to track the position(s) of at least one of the player's hands in a player interaction zone in front of the first display device; and (d) one or more processors and memory devices that co-act or work together with the above mentioned components to provide the enhanced physical player interaction with the EGM. It should be appreciated that: (a) the first display device; (b) the player eye or head tracker; and (c) the player hand position locator, may each be individually configured or may alternatively be configured to operate with the one or more processors and memory devices to provide each of their designated functions described herein. In other words, (a) the first display device may be individually configured to display 3D, or may be configured to operate with the one or more processors and memory devices to display the 3D images; (b) the player eye or head tracker may be individually configured to track the movement of the eyes and/or head of the player 1, or may be configured to operate with the one or more processors and memory devices to track the movement of the eyes and/or head of the player 1; and (c) the player hand position locator may individually be configured to track the position(s) of at least one of the player's hands, or may be configured to operate with the one or more processors and memory devices to track the position(s) of at least one of the player's hands. Thus, for purposes of this disclosure and for brevity, each of these devices are sometimes discussed as performing such tasks individually or operating with the one or more processors and memory devices to perform such task, and such descriptions are not intended to limit the present disclosure to either configuration.

In certain embodiments, the first display device, the player eye or head tracker, the player hand position locator, the one or more processor(s), and the one or more memory device(s) are configured to provide the enhanced physical player interaction of the present disclosure by operating on a real time or substantially real time basis to: (a) cause the first display device to display 3D images such that the player 1 in front of the first display can see one or more virtual objects in a player interaction zone in front of the first display device or projecting toward the player 1; (b) determine movements of the player's eyes or head and cause the first display device to vary the display relating to the virtual object(s) in the player interaction zone based on such player eye or head movements; (c) determine the positions of one or more of the player's hands positioned in the player interaction zone in front of the display device; (d) determine or estimate the position(s) of the player's hand(s) relative to the apparent positions of the virtual objects displayed in the player interaction zone; and (e) enable the player 1 to interact with the virtual objects in the player interaction zone in part by changing the display of the objects based on the position(s) of the player's hand(s) and in part based on causing a physical interaction with the player's hand(s) to occur in the player interaction zone at the position(s) of the virtual object(s), thus giving the player 1 a sense that the player 1 actually touched one or more of the virtual objects as if the virtual object(s) were physical objects floating in the player interaction zone.

More specifically, in this illustrated example embodiment, the first display device 300 of the EGM 100 that is configured to display one or more 3D images to the player 1 without requiring the player 1 to wear 3D glasses includes one or more lenticular lenses (not shown). The first display device 300 including the lenticular lense(s) is in various embodiments configured to display or project what appears to the player 1 as one or more 3D virtual objects that are projected towards the player 1 or projected in the player interaction zone in front of the player 1. The first display device 300 including the lenticular lense(s) can, in various embodiments, be configured to display or project what appears to the player 1 as one or more 3D virtual objects that come from behind the front face or screen of the display device.

It should also be appreciated that other suitable 3D or virtual object displaying systems or devices can be employed in accordance with the present disclosure.

In this illustrated example embodiment, the player hand position locator of the EGM 100 that is configured to track or determine the position(s) of at least one of the player's hands in front of the first display device 300 in right and left player hand tracking zones 314 and 315 (shown in FIG. 5) includes a plurality of cameras 330 and 340 supported by the cabinet 200 and positioned adjacent to the first display device 300. In this illustrated embodiment, one camera 330 is positioned directly to the right of the display device 300 (looking forward) and one camera 340 is positioned directly to the left of the display device 300 (looking forward). In this illustrated embodiment, the plurality of cameras 330 and 340 are positioned adjacent to the upper right hand corner of the display device 300 and the other of the plurality of cameras is positioned adjacent to the upper left hand corner of the display device 300. It should be appreciated that in an alternative embodiment, the cameras are to be positioned adjacent to the lower right hand corner of the display device 300 and positioned adjacent to the lower left hand corner of the display device 300. It should be appreciated that in other alternative embodiments, the cameras can be otherwise alternatively positioned in accordance with the present disclosure. It should also be appreciated that in other alternative embodiments, the EGM can include only one such camera or more than two such cameras in accordance with the present disclosure. In various embodiments, the player hand position locator is configured to locate part of the player's hand such as one or more fingers. In various embodiments, the player hand position locator is configured to simultaneously locate both of the player's hands or locate multiple parts of the player's hands such as two or more fingers.

In various embodiments, the cameras 330 and 340 are or include three dimensional cameras, such as time of flight (TOF) depth camera sensors, positioned at the two opposite sides of the display device 300 and focused inwardly somewhat towards each other. This configuration enables the cameras 330 and 340 to track objects such as one or more of the player's hands in the relatively large right and left player hand tracking zones 314 and 315 (shown in FIG. 5), respectively. These right and left player hand tracking zones 314 and 315 overlap the player interaction zone. In various embodiments, the time of flight depth camera sensors make the EGM less prone to occlusions. In various embodiments, the time of flight depth cameras also deliver point clouds that can be quickly analyzed and used by the processor(s) to make the necessary determinations. It should be appreciated that other suitable depth sensors (other than time of flight sensors) may be employed in accordance with the present disclosure.

In various embodiments, the EGM 100 uses the image data provided by the cameras 330 and 340 to determine the position(s) of the player's hand(s) in the right and left player hand tracking zones 314 and 315 and thus also in the player interaction zone. In certain embodiments, the EGM 100 creates the object depth images using point clouds provided by three dimensional cameras (e.g., the time of flight depth cameras) and merges these point clouds to create one optimized point cloud that represents the object(s) such as the player's hand(s) in right and left player hand tracking zones 314 and 315, and thus any portions thereof also in the player interaction zone and relative to the display device 300. This provides a high degree of accuracy and a relatively large coverage area and player interaction zone (than would a one camera system).

Using these two cameras and keeping the camera resolution relatively low: (a) facilitates an increased size of the player interaction zone; and (b) reduces the need for high data rates and significant processing time or delays for image analysis that may slow down the EGM and prevent real time or substantially real time physical player feedback or sensation. Using these two cameras also better facilitates the tracking of multiple player hands.

In various other embodiments, the EGM uses the image data provided by the cameras 330 and 340 to determine the closest depth of the end of the player's hand(s) such as the end of one of the player's fingers that is in the player interaction zone closest to the display device 300. In other words, in these alternative embodiments, the EGM determines the nearest point (i.e., the xyz coordinate relative to the display device 300) of the object such as the player's hand to the display device 300, and then uses the image data provided by the cameras 330 and 340 to determine movements or gestures by the player's hand(s).

In certain embodiments, the EGM includes one or more camera sync cables (not shown) that sync the multiple cameras 330 and 340 to enhance the accuracy of the determination of the position(s) of the player's hand(s) in the right and left player hand tracking zones 314 and 315 and in the player interaction zone. It should be appreciated that the image data from the multiple cameras can be synced in other suitable manners in accordance with the present disclosure.

In various embodiments, multiple fiducial markers 380 and 390 are integrated into a bezel mask 410 surrounding the display device 300 and held by the cabinet 200. The bezel mask 410 may generally be described as a mask portion which makes the appearance of the display device 300 flow into the cabinet 200. The bezel mask 410 may further be used to integrate the multiple cameras 330 and 340 into the cabinet 200 while remaining inconspicuous to the player 1. The fiducial markers 380 and 390 are used for calibrating the cameras 330 and 340 to a common coordinate system of the display device 300, as will be further described below. To wit, multiple fiducial markers may be incorporated (integrated) into the bezel mask 410 on a left side of the display device 300 (herein collectively referred to as fiducial markers 380), and multiple fiducial markers may be incorporated into the bezel mask 410 on a right side of the display device 300 (herein collectively referred to as fiducial markers 390). In some embodiments, fiducial markers 380 and 390 respectively each comprise two fiducial markers of which one fiducial marker is positioned slightly below cameras 330 and 340 (e.g., one to six inches below) on either side (right and left sides) of the display device 300, and one fiducial marker positioned slightly above a bottom corner of the display device 300 (e.g., one to six inches above) on either side.

It should also be appreciated that other suitable player hand position locating systems or devices can be employed in accordance with the present disclosure.

In various embodiments, at the same time or slightly after the EGM creates the physical interaction with the player's hand(s) in the player interaction zone, the EGM can cause the display device 300 to alter the images including the virtual objects in the player interaction zone. This can be used to show one or more responses of the virtual objects or other displayed images to the interaction with the player's hand(s).

Thus, in various embodiments, the EGM captures the player's hand or finger midair location coordinates while performing a movement in the player interaction zone in real time, provides haptic sensation to the player's hand(s) or finger(s) at these coordinates in the player interaction zone with no or little lag time, and can additionally alter the displayed virtual objects in real time.

In various embodiments, the EGM maps one or more of the player's hand(s) into the virtual environment displayed by the display device 300 and/or into the player interaction zone. In certain such embodiments, the display device 300 can display part of one or more of the player's hand(s) on the display device 300 or as a virtual object to further enhance the player interaction.

In the illustrated example embodiment of the EGM 100 of the present disclosure shown in FIGS. 1 to 6, the cameras 330 and 340 of the player hand position locator of the EGM 100 are positioned directly to the right and left of first display device 300. It should be appreciated that in an alternative embodiment of the present disclosure, the cameras of the player hand position locator of the EGM are positioned directly below and above the first display device, or in any other suitable location.

In the illustrated example embodiment, the processor(s) and memory device(s) of the EGM 100 co-act or work together to provide the enhanced physical player interaction with the EGM 100 and incorporate the player's hand(s) into one or more of the games provided by the EGM or other functionality provided by the EGM. For example, the displayed or projected virtual object(s) can be part of a game that enables or requires the player to interact with the object as part of the play of the game.

It should be appreciated from the above that in various embodiments, the EGM can provide the enhanced physical player interaction in conjunction with game play or other functionality provided by the EGM to the player. For example, the EGM can provide interaction with one or more fingers or hands upon sensing player gestures to control game play or other functionality related to the EGM or the gaming establishment.

Calibrating Object Sensors to a Common Coordinate System

Returning to FIGS. 1-5 and upon having considered the foregoing three-dimensional gaming architecture described previously, a calibration technique for calibrating the hand tracking cameras 330 and 340 and/or the head tracking camera 320 to accurately capture the player interaction zone on the display device 300 is provided. It should be noted that the hand tracking cameras 330 and 340, and the head tracking camera 320 are additionally referred to herein as simply "object sensors". These components, again, may act individually, co-act or work in conjunction with one another to display 3D images on the display device 300 per the motion inputs of player 1. Thus, when considering the associated functionality of object sensors, the techniques described herein may be suitable for each of the hand tracking cameras 330 and 340, and the head tracking camera 320, working individually or collectively. In a described embodiment, specifically when considering the functionality of the fiducial markers 380 and 390, the calibrative mechanisms described hereinbelow are particularly suited to the hand tracking cameras 330 and 340, however this functionality may apply to all object sensors of the EGM 100 including the head tracking camera 320, as one in the art would appreciate.

As aforementioned, the hand tracking cameras 330 and 340 may preferably comprise time of flight cameras integrated into (or behind) the bezel mask 410 surrounding the display device 300 disposed within the cabinet 200. When manufacturing the EGM 100, variations in the physical mounting of the cameras 330 and 340 (and additionally variations in the manufacture of the cameras 330 and 340 themselves) introduce a certain amount of error between the expected orientation and the actual orientation of the respective camera 330 and 340. Because (at least) two cameras 330 and 340 are used to accurately capture the player interaction zone, the cameras 330 and 340 must work as a system in conjunction with the display device 300 to observe the player's movements in three-dimensional space, and convert these movements to the x, y, z coordinates that the processor of the EGM 100 can recognize and convert into inputs which affect various gaming functionality of the EGM 100. Hence, the calibration mechanism described herein receives the x, y, z coordinates and accounts for any adjustments needed, due to variations in physical mounting and manufacturing of the EGM 100 and its associated components, through the use of the fiducial markers 380 and 390 positioned on either side of the display device 300.

The fiducial markers 380 and 390 may be comprised of an Infrared (IR) reflective material such that the fiducial markers 380 and 390 are inconspicuous to the player 1 (e.g., the fiducial markers appear grey or black to the player 1), however provide high visibility when observed by the cameras 330 and 340, especially under IR light. The fiducial markers 380 and 390 may be comprised of a fabric material similar to that used in outdoor reflective clothing or a non-fabric, flexible material which may have an adhesive backing (e.g., tape). In some embodiments, a 3M® reflective material or "Glint tape" may be suitable for use as the fiducial markers 380 and 390. The fiducial markers 380 and 390 may be mounted or positioned behind the bezel mask 410, with apertures cut through the bezel mask 410 to allow the fiducial markers 380 and 390 to be shown through so as to be captured by the cameras 330 and 340. In various embodiments, the fiducial markers 380 and 390 may be of any shape and size, however, preferably, the fiducial markers 380 and 390 are small ovals or rounded squares and on the order of millimeters in size.

As previously detailed, in various embodiments, the cameras 330 and 340 are mounted on either side of the display device 300, and each pointed toward an opposite corner of the display device 300, yet angled slightly outward (toward the player 1) to capture motion inputs of the player 1. A field of view of each of the cameras 330 and 340 may overlap so as to capture both sides of the player's hands, however one side of each camera frustum of the cameras 330 and 340 is substantially parallel to the face of the display device 300. This arrangement has several key advantages. First, the imaging area of cameras 330 and 340, when combined, cover a wider interaction area where gestures are likely, and again, the cameras 330 and 340 capture information of the hand movements of the player 1 from two different angles, which improves the accuracy of gesture recognition. Further, each camera 330 and 340 has within its field of view the edge of the bezel mask 410 surrounding the display 300 which allows the cameras 330 and 340 to each capture thorough images of the fiducial markers 380 and 390 integrated therein on either side of the display device 300.

In some embodiments, the fiducial markers 380 and 390 integrated into the bezel mask 410 surrounding the display device 300 are arranged such that each camera 330 and 340 has view of two of the fiducial markers 380 and 390 positioned on an opposite side of the display device 300. That is, camera 330 has within its field of view the fiducial markers 390 and camera 340 has within its field of view the fiducial markers 380. The fiducial markers 390 as observed by the camera 330 should be viewed exclusive to the fiducial markers 380 observed by the camera 340, otherwise, the calibration results would be invalidated. In other words, the camera 330 views the fiducial markers 390 independent of the camera 340 viewing the fiducial markers 380. The bezel mask 410 is assumed to be accurate in its construction (e.g., manufactured under tightly controlled tolerances) such that the fiducial markers 380 and 390 are static and predictable as to their location. Moreover, because the cameras 330 and 340 are both attached to (or attached in relationship to) the display device 300, these components are also assumed to be constructed correctly under tightly controlled tolerances. Hence, the critical components of the calibration system are well controlled when considered in their relationship to each of the other components.

Because the fiducial markers 380 and 390 are static (not movable), calibration of the cameras 330 and 340 by the EGM 100 in relationship to the player interaction zone may be performed as often as necessary to account for any environmental or other factors which may affect performance and accuracy. Thus, the calibration is performed automatically via the processor of the EGM 100 without any initiation by the player or an administrator, and may be performed at any predetermined intervals (e.g., once daily, once an hour, once every half hour, etc.). The advantage to this automatic and often calibration mechanism is improved accuracy of the cameras 330 and 340, because effects of temperature variation (or other environmental variables) can be cancelled out. Moreover, if the system is subjected to shocks or vibration during transportation and/or set up, these events, which may cause misalignment of the cameras 330 and 340 for example, are also corrected for. Further, because it is unnecessary for any user or technician intervention to perform the calibration, this inherently lowers cost of ownership of the system.

Upon initiation of the calibration, each camera 330 and 340 records several frames of data. That is, each camera 330 and 340 records a predetermined number of image frames which may be performed at a predetermined framerate. The processor of the EGM then uses these frames of data to detect the position (within the frames) of the fiducial markers 380 and 390 as observed in x, y, z coordinate positions relative to the respective camera 330 and 340. This data is then compared by the processor to the expected x, y, z coordinate positions of the fiducial markers 380 and 390. It should be noted that the automatic calibration may be performed with the fiducial markers 380 and 390 physically located in any position, so long as the fiducial markers 380 and 390 remain visible to the cameras 330 and 340.

Once the values of the observed coordinate positions of the fiducials markers 380 and 390 are compared to the expected coordinate positions of the fiducial markers 380 and 390, the difference between values of the observed coordinate positions and the expected coordinate positions may be expressed as a 3×3 matrix of rotations. In other words, the cameras 330 and 340 are rotated (to some degree) to calculate a position of each of the fiducial markers 380 and 390 to find a series of coefficient values of observed coordinates versus expected coordinates in three-dimensional space. The difference of such values is then input into the rotation matrix. This rotation matrix is reported by the processor to the foundation software of the EGM 100 and used to convert the x, y, z coordinate data of both cameras 330 and 340 with respect to a common coordinate system of the display device 300. The common coordinate display system of the display device 300 is then used by various gaming functionality executed by a processor of the EGM 100 to accurately detect and display inputs from the player 1 within the player interaction zone 310.

Figure 6:
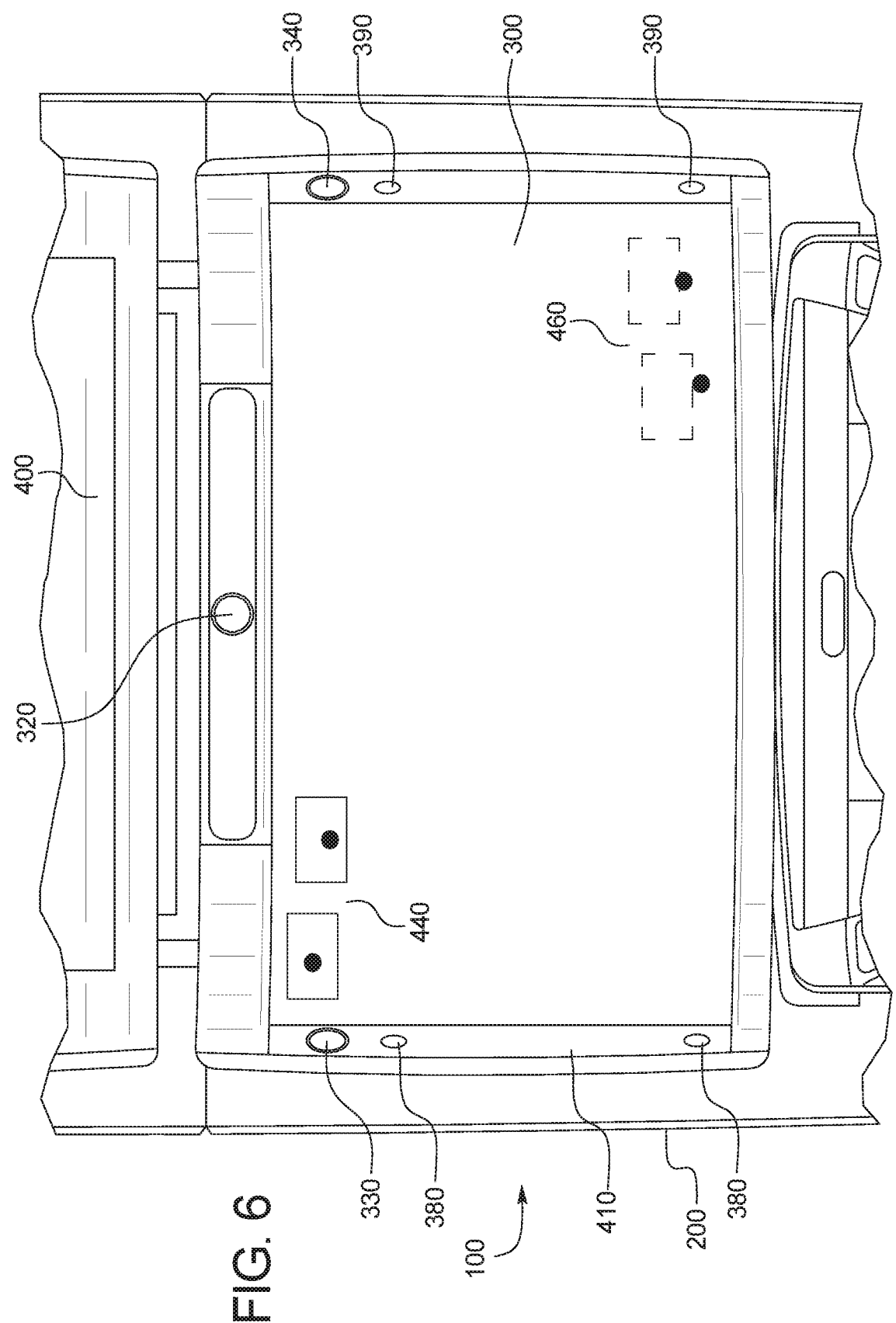
FIG. 6 is an additional enlarged fragmentary front view of the central portion of the EGM of FIG. 1, showing calibration markers for calibrating object sensors within the EGM.

A graphical representation of an initial calibration process is illustrated in FIG. 6 with reference to calibration targets 440 and 460. FIG. 6 depicts a factory set up configuration, which is a manual pre-calibration, separate and prior to the automatic calibration and rotation matrix calculation as previously described. That is, FIG. 6 illustrates a process during manufacture of the EGM 100 and it should be noted that a player (e.g., player 1) would not see such a graphical illustration on the display device 300 during normal operation.

Nevertheless, to perform an initial calibration of the cameras 330 and 340, the camera 340 observes calibration targets 440 to be within a boundary of an acceptable error with respect to the fiducial markers 390, and camera 330 observes calibration targets 460 to be outside a boundary of an acceptable error with respect to the fiducial markers 380. It is important the cameras 330 and 340 are approximately accurate during the time of manufacture such that the view area of each camera is as intended. That is, the view area of each camera should have within its respective field of view the intended interaction zone, have within its field of view the fiducial markers in the respective camera view zone, and have outside its respective field of view the display device 300. It should be noted that it is important to remove the face (screen) of the display device 300 from the field of view of the respective cameras 330 and 340, as viewing such may cause reflections that can confuse the respective camera. This is an additional reason the camera frustum is configured to be parallel to the face of the display device 300.

As one of ordinary skill in the art would appreciate, one advantage of the calibration techniques disclosed herein is that it improves accuracy of the one or both of the cameras 330 and 340. Because, generally, two cameras are used, each camera can be compared to a common spatial coordinate system. This results in better hand tracking capabilities because the player's hand can be seen from two different angles (which can be advantageous if one hand were blocking view of the other). This further inherently generates a larger player interaction zone than when using one camera by itself.

Figure 7:
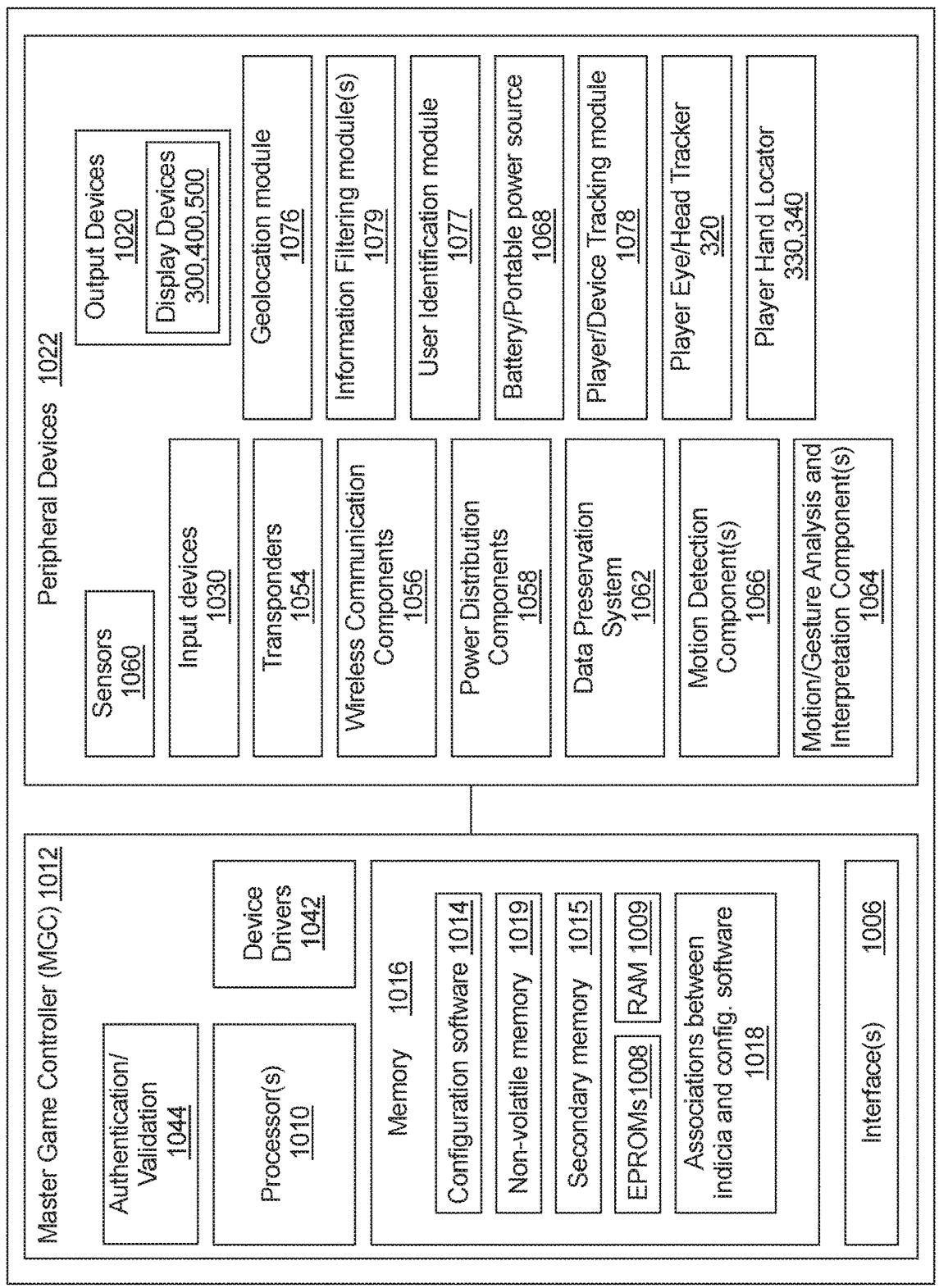
FIG. 7 is a schematic block diagram of one exemplary embodiment of the electronic configuration of the EGM of FIG. 1.

Referring now to FIG. 7, in various embodiments, the EGM 100 includes a master game controller 1012 configured to communicate with and to operate with a plurality of peripheral devices 1022 in addition to display devices 300, 400, 500, player eye/head tracker 320, and player hand locators 330 and 340.

The master game controller 1012 (e.g., a master gaming controller) includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM 100; (4) communicating with interfaces and the peripheral devices 1022 (such as input/output devices); and/or (5) controlling the peripheral devices 1022. In certain embodiments, one or more components of the master game controller 1012 (such as the at least one processor 1010) reside within a housing of the EGM 100, while in other embodiments at least one component of the master game controller 1012 resides outside of the housing of the EGM 100.

The master game controller 1012 also includes at least one memory device 1016, which includes: (1) volatile memory (e.g., RAM 1009, which may include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM 100 disclosed herein. In certain embodiments, the at least one memory device 1016 resides within the housing of the EGM 100 (described below), while in other embodiments at least one component of the at least one memory device 1016 resides outside of the housing of the EGM 100.

The at least one memory device 1016 is configured to store, for example: (1) configuration software 1014, such as all the parameters and settings for a game playable on the EGM 100; (2) associations 1018 between configuration indicia read from an EGM 100 with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM 100 to communicate with local and non-local devices using such protocols. In one implementation, the master game controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM 100 to control the EGM 100. The at least one memory device 1016 of the EGM 100 also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM 100 through any suitable data network described above (such as an Internet or intranet).

The at least one memory device 1016 also stores a plurality of device drivers 1042. Examples of different types of device drivers include device drivers for EGM components and device drivers for the peripheral devices 1022. Typically, the device drivers 1042 utilize various communication protocols that enable communication with a particular physical device. The device driver abstracts the hardware implementation of that device. For example, a device driver may be written for each type of card reader that could potentially be connected to the EGM 100. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (Wi-Fi), etc. In one embodiment, when one type of a particular device is exchanged for another type of the particular device, the at least one processor of the EGM 100 loads the new device driver from the at least one memory device to enable communication with the new device. For instance, one type of card reader in the EGM 100 may be replaced with a second different type of card reader when device drivers for both card readers are stored in the at least one memory device.

In certain embodiments, the software units stored in the at least one memory device 1016 may be upgraded as needed. For instance, when the at least one memory device 1016 is a hard drive, new games, new game options, new parameters, new settings for existing parameters, new settings for new parameters, new device drivers, and new communication protocols may be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 may be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units may be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, in addition to the input, output and other components described in the first section above, the peripheral devices 1022 include several device interfaces, such as: (1) at least one output device 1020 including at least one display device (e.g., see display devices 300, 400, 500 of FIG. 1-3; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component(s) 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 300, 400, 500 configured to display any game(s) displayed by the EGM 100 and any suitable information associated with such game(s). In certain embodiments, the display devices are connected to or mounted on a housing of the EGM 100. In various embodiments, the display devices serve as digital glass configured to advertise certain games or other aspects of the gaming establishment in which the EGM is located. In various embodiments, the EGM 100 includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. For example, the exemplary EGM 100 illustrated in FIG. 1 includes a first display device 300, a player tracking display, a credit display, and a bet display.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM 100 are configured to display one or more game and/or non-game images, symbols, and indicia. In certain embodiments, the display devices of the EGM 100 are configured to display any suitable visual representation or exhibition of the movement of objects; dynamic lighting; video images; images of people, characters, places, things, and faces of cards; and the like. In certain embodiments, the display devices of the EGM 100 are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

Figure 1:
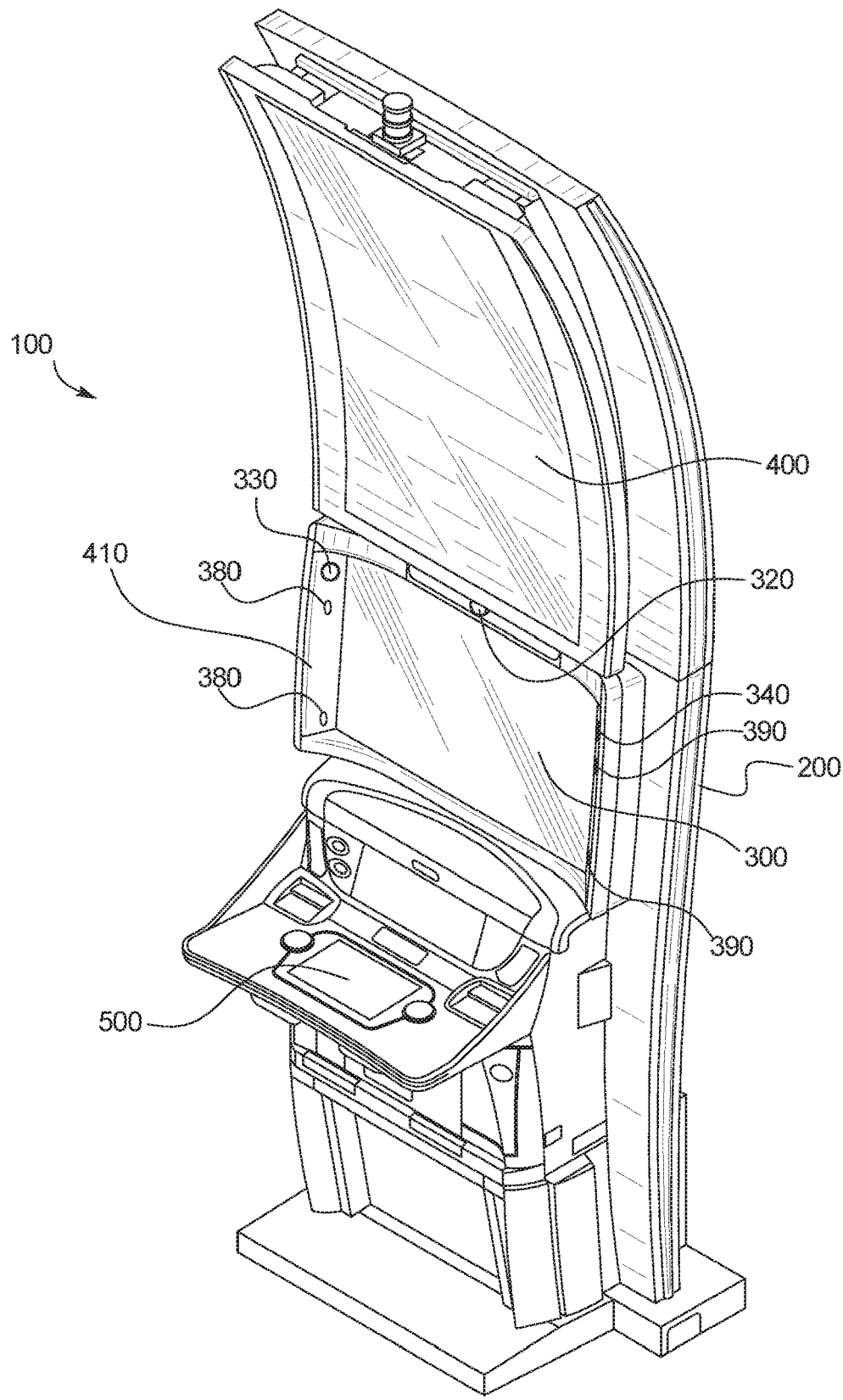
FIG. 1 is a front perspective view of one example embodiment of the electronic gaming machine (EGM)
Figure 2:
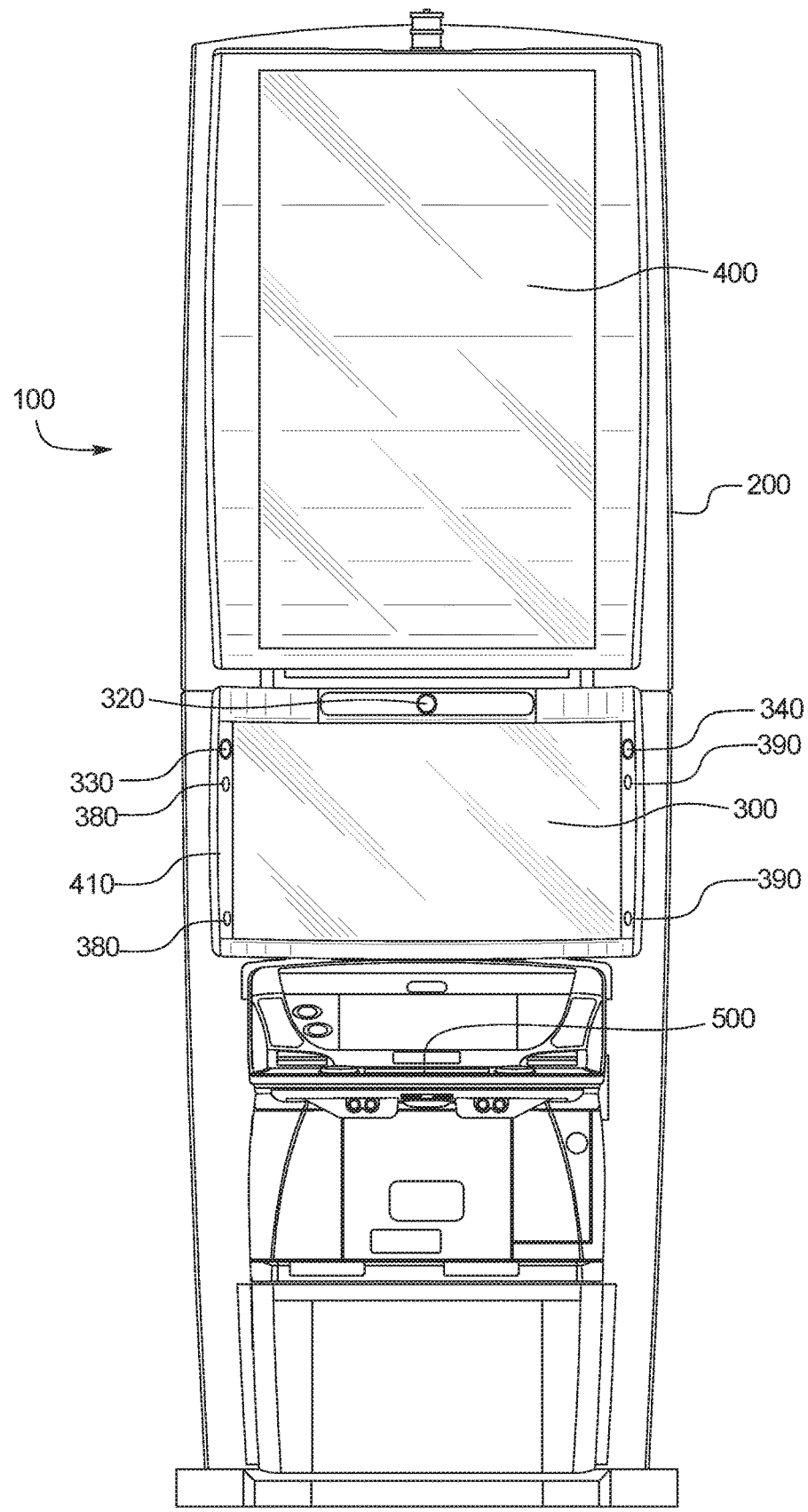
FIG. 2 is a front view of the EGM of FIG. 1.
Figure 3:
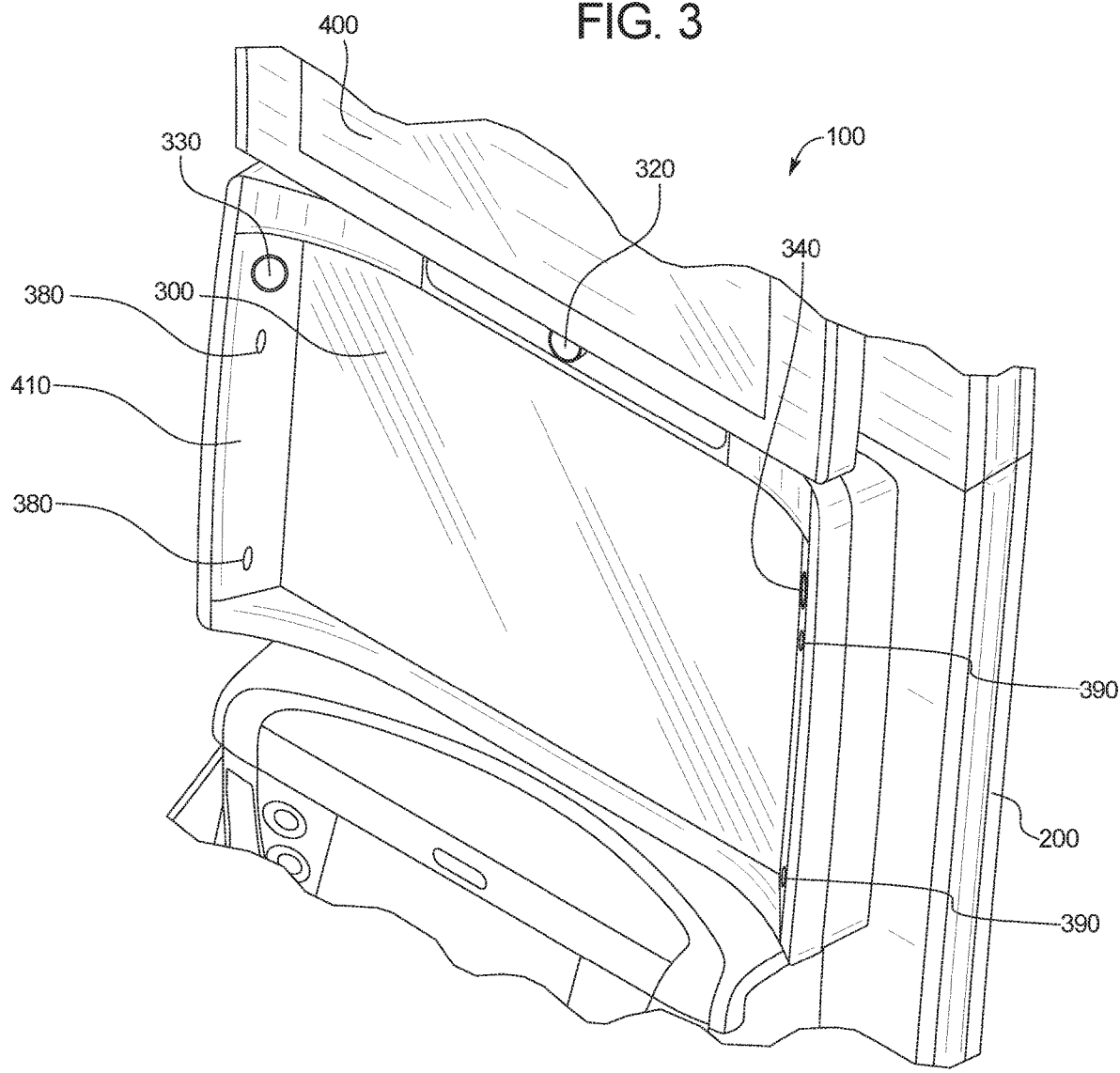
FIG. 3 is an enlarged fragmentary perspective view of the central portion of the EGM of FIG. 1.
Figure 4:
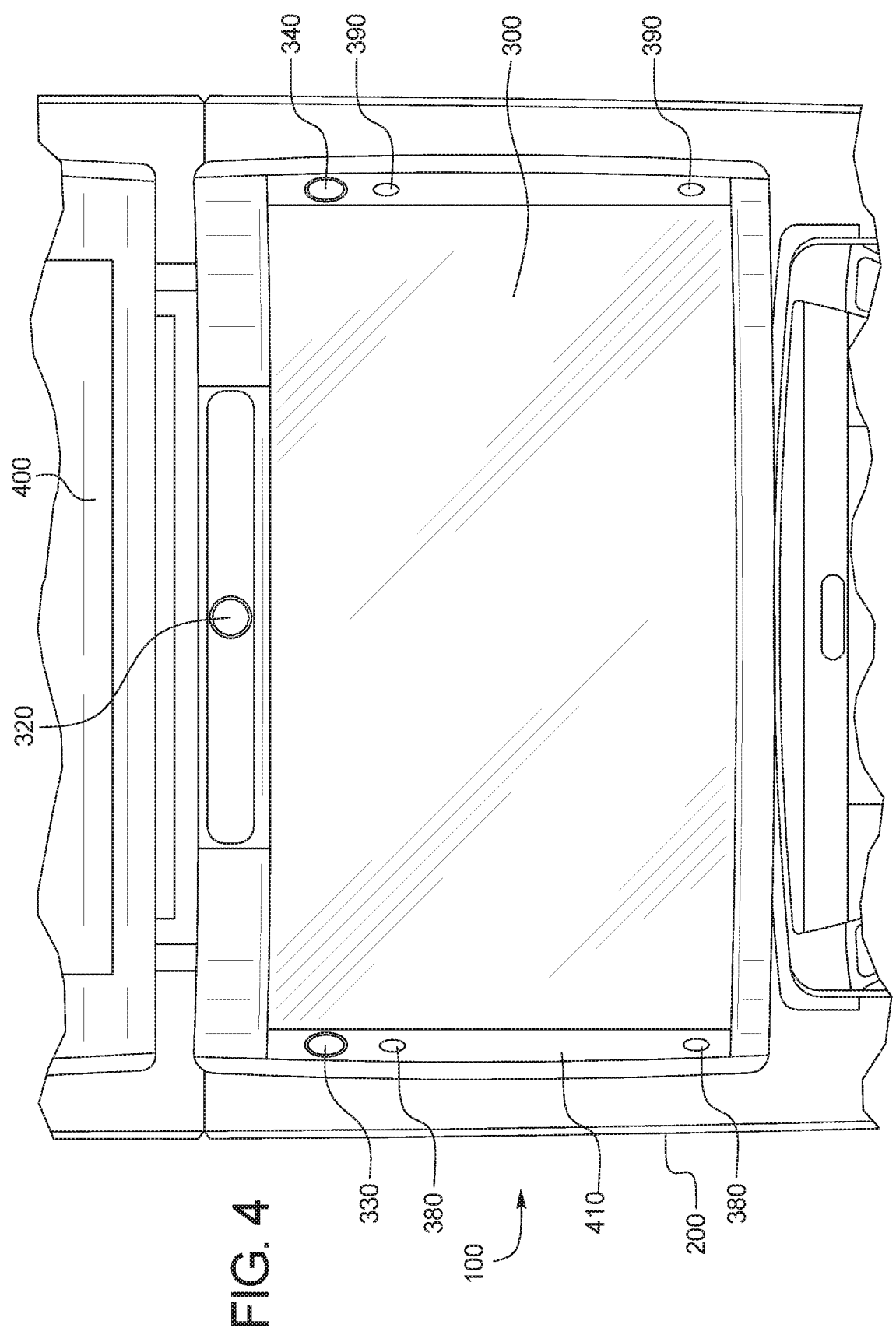
FIG. 4 is an enlarged fragmentary front view of the central portion of the EGM of FIG. 1.

In various embodiments, the at least one output device 1020 includes a payout device. In these embodiments, after the EGM 100 receives an actuation of a cashout device (described below), the EGM 100 causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. For example, the exemplary EGM 100 as illustrated in FIG. 1 may include a ticket printer and dispenser.

In certain embodiments, the at least one output device 1020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM 100, such as an attract mode. For example, the exemplary EGM 100 illustrated in FIG. 1 includes a plurality of speakers. In another such embodiment, the EGM 100 provides dynamic sounds coupled with attractive multimedia images displayed on one or more of the display devices to provide an audio-visual representation or to otherwise display full-motion video with sound to attract players to the EGM 100. In certain embodiments, the EGM 100 displays a sequence of audio and/or visual attraction messages during idle periods to attract potential players to the EGM 100. The videos may be customized to provide any appropriate information.

The at least one input device 1030 may include any suitable device that enables an input signal to be produced and received by the at least one processor 1010 of the EGM 100.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 may include a combined bill and ticket acceptor and a coin slot.

In certain embodiments, the at least one input device 1030 includes at least one wagering or betting device. In various embodiments, the one or more wagering or betting devices are each: (1) a mechanical button supported by the housing of the EGM 100 (such as a hard key or a programmable soft key), or (2) an icon displayed on a display device of the EGM (described below) that is actuatable via a touch screen of the EGM (described below) or via use of a suitable input device of the EGM 100 (such as a mouse or a joystick). One such wagering or betting device is a maximum wager or bet device that, when actuated, causes the EGM 100 to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM 100 to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM 100 (such as a hard key or a programmable soft key), or (2) an icon displayed on a display device of the EGM (described below) that is actuatable via a touch screen of the EGM (described below) or via use of a suitable input device of the EGM 100 (such as a mouse or a joystick). After a player appropriately funds the EGM 100 and places a wager, the EGM 100 activates the game play activation device to enable the player to actuate the game play activation device to initiate a play of a game on the EGM 100 (or another suitable sequence of events associated with the EGM 100). After the EGM 100 receives an actuation of the game play activation device, the EGM 100 initiates the play of the game. The exemplary EGM 100 illustrated in FIG. 1 may include a game play activation device in the form of a game play initiation button. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM 100 (such as a hard key or a programmable soft key), or (2) an icon displayed on a display device of the EGM 100 that is actuatable via a touch screen of the EGM 100 or via use of a suitable input device of the EGM 100 (such as a mouse or a joystick). When the EGM receives an actuation of the cashout device from a player and the player has a positive (i.e., greater-than-zero) credit balance, the EGM initiates a payout associated with the player's credit balance. The exemplary EGM 100 illustrated in FIG. 1 may include a cashout device in the form of a cashout button.

In various embodiments, the at least one input device 1030 includes a plurality of buttons that are programmable by the EGM 100 operator to, when actuated, cause the EGM to perform particular functions. For instance, such buttons may be hard keys, programmable soft keys, or icons displayed on a display device of the EGM 100 that are actuatable via a touch screen of the EGM 100 or via use of a suitable input device of the EGM 100 (such as a mouse or a joystick). The exemplary EGM 100 illustrated in FIG. 1 may include a plurality of such buttons.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM 100 by touching the touch screen at the appropriate locations.

In embodiments including a player tracking system, as further described below, the at least one input device 1030 includes a card reader in communication with the at least one processor of the EGM. The exemplary EGM 100 illustrated in FIG. 1 may include a card reader. The card reader is configured to read a player identification card inserted into the card reader.

The at least one wireless communication component 1056 includes one or more communication interfaces having different architectures and utilizing a variety of protocols, such as (but not limited to) 802.11 (Wi-Fi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM 100, such as one or more rechargeable power sources (e.g., rechargeable batteries) located at the EGM 100.

In certain embodiments, in addition to the components described in the first section above, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM 100 (in addition to the detections described above); detecting the presence and/or identity of various persons (e.g., players, casino employees, etc.), devices (e.g., user input devices), and/or systems within a predetermined proximity to the EGM 100.

The at least one data preservation system 1062 is configured to detect or sense one or more events and/or conditions that, for example, may result in damage to the EGM 100 and/or that may result in loss of information associated with the EGM 100. Additionally, the data preservation system 1062 may be operable to initiate one or more appropriate action(s) in response to the detection of such events/conditions.

In addition to the player eye or head tracker 320, the EGM 100 of the present disclosure may also include at least one motion/gesture analysis and interpretation component 1064 configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM 100 to operate in a mobile environment. For example, in one embodiment, the EGM 100 of FIG. 1 includes one or more rechargeable batteries.

The at least one geolocation module 1076 is configured to acquire geolocation information from one or more remote sources and use the acquired geolocation information to determine information relating to a relative and/or absolute position of the EGM 100. For example, in one implementation, the at least one geolocation module 1076 is configured to receive GPS signal information for use in determining the position or location of the EGM 100. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM 100.

The at least one user identification module 1077 is configured to determine the identity of the current user or current owner of the EGM 100. For example, in one embodiment, the current user is required to perform a login process at the EGM 100 in order to access one or more features. Alternatively, the EGM 100 is configured to automatically determine the identity of the current user based on one or more external signals, such as an RFID tag or badge worn by the current user and that provides a wireless signal to the EGM 100 that is used to determine the identity of the current user. In at least one embodiment, various security features are incorporated into the EGM 100 to prevent unauthorized users from accessing confidential or sensitive information.

The at least one information filtering module 1079 is configured to perform filtering (e.g., based on specified criteria) of selected information to be displayed at one or more displays 300, 400, 500 of the EGM 100.

In various embodiments, the EGM 100 includes a plurality of communication ports configured to enable the at least one processor of the EGM 100 to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

In certain embodiments, the EGM 100 is a device that has obtained approval from a regulatory gaming commission, and in other embodiments, the EGM 100 is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, remote processors, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM 100 randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM 100 generates the game outcome(s) and/or the award(s) to be provided based on the associated probabilities. In these embodiments, since the EGM 100 generates game outcomes and/or awards randomly or based on one or more probability calculations, there is no certainty that the EGM 100 will ever provide any specific game outcome and/or award.

As noted above, in various embodiments, the EGM 100 includes one or more executable game programs executable by at least one processor of the EGM 100 to provide one or more primary games and one or more secondary games. The primary game(s) and the secondary game(s) may comprise any suitable games and/or wagering games, such as, but not limited to: electro-mechanical, video slot or spinning reel type games; video card games such as video draw poker, multi-hand video draw poker, other video poker games, video blackjack games, and video baccarat games; video keno games; video bingo games; and video selection games.

Figure 8:
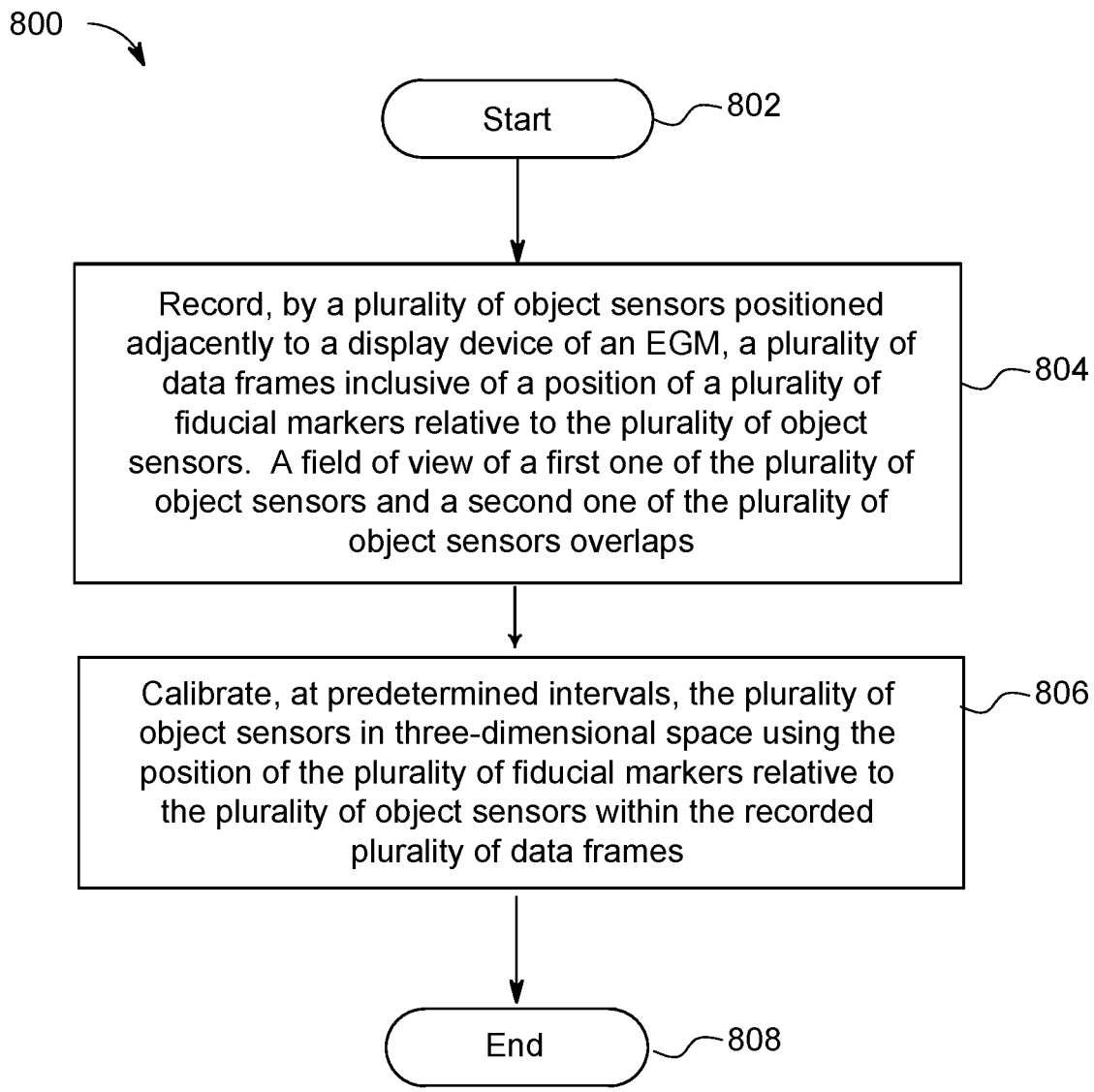
FIG. 8 is a flowchart diagram illustrating an exemplary method for calibrating the object sensors within the EGM.

Now referring to FIG. 8, a flowchart diagram illustrating an exemplary method 800 for calibrating the object sensors within the EGM 100 is depicted. The method 800 begins (step 802) by recording, by a plurality of object sensors positioned adjacently to a display device of an EGM, a plurality of data frames inclusive of a position of a plurality of fiducial markers relative to the plurality of object sensors. A field of view of a first one of the plurality of object sensors and a second one of the plurality of object sensors may overlap (step 804). At predetermined intervals, the plurality of object sensors are calibrated in three-dimensional space using the position of the plurality of fiducial markers relative to the plurality of object sensors within the recorded plurality of data frames (step 806). The method 800 ends (step 808).

In conjunction with the method 800, in some embodiments, observed positions of each of the plurality of fiducial markers within three coordinate axes are compared to expected positions of each of the plurality of fiducial markers within the three coordinate axes.

In conjunction with the method 800, in some embodiments, difference values between the observed positions and the expected positions are expressed as a rotation matrix, the rotation matrix used by the processor to convert the difference values between the observed positions and the expected positions to a common coordinate system of the display device.

The flowcharts and block diagrams in the above figures illustrate the architecture, functionality, and operation of possible implementations of apparatuses, systems, methods and/or computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. An electronic gaming machine (EGM), comprising:
a display device;
a plurality of object sensors, wherein a viewable side of a frustum of a first object sensor of the plurality of object sensors is substantially parallel to a face of the display device;
a plurality of fiducial markers;
at least one processor; and
at least one memory device storing a plurality of computer instructions that, when executed by the at least one processor, cause the at least one processor to operate with the display device and the plurality of object sensors to:
record, by the plurality of object sensors, a plurality of data frames inclusive of a relative position of the plurality of fiducial markers adjacently located to the display device; and
calibrate the plurality of object sensors in three-dimensional space using the relative position of the plurality of fiducial markers within the recorded plurality of data frames.

2. The EGM of claim 1, wherein the plurality of fiducial markers are positioned adjacent to both a right side and a left side of the display device.

3. The EGM of claim 2, wherein a first one of the plurality of object sensors is positioned adjacent to the right side and a second one of the plurality of object sensors is positioned adjacent to the left side of the display device.

4. The EGM of claim 1, wherein a viewable side of a frustum of a second object sensor of the plurality of object sensors is substantially parallel to a face of the display device.

5. The EGM of claim 4, wherein a field of view of the first object sensor overlaps the field of view of the second object sensor.

6. The EGM of claim 3, wherein the plurality of fiducial markers are positioned such that the first one of the plurality of object sensors observes the plurality of fiducial markers positioned adjacent to the left side exclusive to the second one the plurality of object sensors observing the plurality of fiducial markers positioned adjacent to the right side.

7. The EGM of claim 1, wherein the plurality of object sensors each comprise three-dimensional cameras.

8. The EGM of claim 7, wherein the plurality of fiducial markers are composed of an Infrared (IR) reflective material detectable by the three-dimensional cameras.

9. The EGM of claim 8, wherein recording the plurality of data frames further comprises recording, by the three-dimensional cameras, a predetermined number of video frames at a predetermined frame rate.

10. The EGM of claim 1, wherein calibrating the plurality of object sensors in three-dimensional space further comprises comparing, by the processor, observed positions of each of the plurality of fiducial markers within three coordinate axes to expected positions of each of the plurality of fiducial markers within the three coordinate axes.

11. The EGM of claim 10, wherein difference values between the observed positions and the expected positions are expressed as a rotation matrix, the rotation matrix used by the processor to convert the difference values between the observed positions and the expected positions to a common coordinate system of the display device.

12. An electronic gaming machine (EGM), comprising:
a display device configured to display three-dimensional images;
a plurality of object sensors including at least two cameras positioned adjacent to the display device, wherein a viewable side of a frustum of a first object sensor of the plurality of object sensors is substantially parallel to a face of the display device;
a plurality of fiducial markers positioned adjacent to the display device;
at least one processor; and
at least one memory device storing a plurality of computer instructions that, when executed by the at least one processor, cause the at least one processor to operate with the display device and the plurality of object sensors to:
record, by the plurality of object sensors, a plurality of data frames inclusive of a position of the plurality of fiducial markers relative to the plurality of object sensors; wherein a field of view of a first one of the plurality of object sensors and a second one of the plurality of object sensors overlaps; and
calibrate, at predetermined intervals, the plurality of object sensors in three-dimensional space using the position of the plurality of fiducial markers relative to the plurality of object sensors within the recorded plurality of data frames.

13. The EGM of claim 12, wherein the plurality of fiducial markers are composed of an Infrared (IR) reflective material and integrated into both a right side and a left side of a bezel mask surrounding the display device.

14. The EGM of claim 13, wherein the first one of the plurality of object sensors is integrated into the bezel mask at a top right side of the display device, and the second one of the plurality of object sensors is integrated into a bezel mask at a top left side of the display device.

15. The EGM of claim 12, wherein the first and the second ones of the plurality of object sensors are each pointed at opposite, bottom corners of the display device and positioned to view the plurality of fiducial markers and at least a portion of a player's body.

16. The EGM of claim 12, wherein the plurality of object sensors each comprise three-dimensional cameras.

17. The EGM of claim 12, wherein calibrating the plurality of object sensors in three-dimensional space further comprises comparing, by the processor, observed positions of each of the plurality of fiducial markers within three coordinate axes to expected positions of each of the plurality of fiducial markers within the three coordinate axes.

18. The EGM of claim 17, wherein difference values between the observed positions and the expected positions are expressed as a rotation matrix, the rotation matrix used by the processor to convert the difference values between the observed positions and the expected positions to a common coordinate system of the display device.

19. A method for calibrating object sensors in an electronic gaming machine (EGM), by a processor, comprising:
recording, by a plurality of object sensors positioned adjacently to a display device of the EGM, a plurality of data frames inclusive of a position of a plurality of fiducial markers relative to the plurality of object sensors; wherein a viewable side of a frustum of a first one of the plurality of object sensors and a second one of the plurality of object sensors are substantially parallel to a face of the display device; and calibrating, at predetermined intervals, the plurality of object sensors in three-dimensional space using the position of the plurality of fiducial markers relative to the plurality of object sensors within the recorded plurality of data frames.

20. The method of claim 19, further comprising comparing, by the processor, observed positions of each of the plurality of fiducial markers within three coordinate axes to expected positions of each of the plurality of fiducial markers within the three coordinate axes, wherein difference values between the observed positions and the expected positions are expressed as a rotation matrix, the rotation matrix used by the processor to convert the difference values between the observed positions and the expected positions to a common coordinate system of the display device.

* * * * *